Dec. 21, 1937.                D. SHERWOOD                2,103,096
                        WATER PUMP THRUST BEARING
                         Filed Nov. 25, 1935          2 Sheets-Sheet 1

INVENTOR
David Sherwood
BY
ATTORNEYS

Dec. 21, 1937.  D. SHERWOOD  2,103,096
WATER PUMP THRUST BEARING
Filed Nov. 25, 1935  2 Sheets-Sheet 2

INVENTOR
David Sherwood
BY
ATTORNEYS

Patented Dec. 21, 1937

2,103,096

UNITED STATES PATENT OFFICE 2,103,096

WATER PUMP THRUST BEARING

David Sherwood, Grosse Pointe Park, Mich., assignor to Sherwood Brass Works, Detroit, Mich., a corporation of Michigan Application November 25, 1935, Serial No. 51,343

1 Claim. (Cl. 103—126)

The present invention relates to water pumps, and more particularly to pumps such as are employed for circulating water through the cooling systems of marine engines.

The primary object of the present invention is to provide a water pump wherein the impelling means is capable of handling unclean water without appreciable wear. For example, when boats are operated in unclean or muddy waters the minute abrasive particles which are held in suspension ordinarily cause rapid wear of the impelling means which results in a reduction in efficiency. The liquid impelling means in the present pump comprises two meshing gears which are both positively driven. The pumping gears are constructed and supported so that there is a slight clearance, amounting to a few thousandths of an inch therebetween, so that the gears do not actually contact with each other. This small clearance is not sufficient to reduce the efficiency of the pump but it enables the pump to handle unclean water without appreciable wear.

Another object of the present invention is to provide a novel means for assembling a water pump on a marine engine so that it may be operated by a moving part in the engine, for example a gear connected to the crank shaft or the cam shaft. Such gears are commonly of the helical type which when driven set up end thrust and the object of the assembly means is to provide for the mounting of thrust bearings to prevent the thrust of the helical gears from causing wear of the liquid impelling means. In this connection attention is called to the known fact that water pumps of the present type are subject to leakage and are provided with packing means capable of being tightened when the leakage occurs. The invention provides for the packing of the pump in a manner whereby the leakage which occurs after intervals of use does not contact with the thrust bearings, this feature being especially important in the case of unclean water.

Other objects refer to the construction and assembly of the pump and the manner in which the packing is arranged, the purpose being to prevent the possibility of water entering the crank case of the engine when leakage occurs. Also to support the driving shaft and its gear for operating the same in mesh with a moving gear in the engine in a manner whereby the pump operating gear will not cause wear of the gear in the engine, such wear being ordinarily caused through misalignment of the pump shaft in an ordinary pump when the impelling means becomes worn.

With the above and other ends in view the invention is more fully disclosed with reference to the accompanying drawings, in which—

Figure 1:
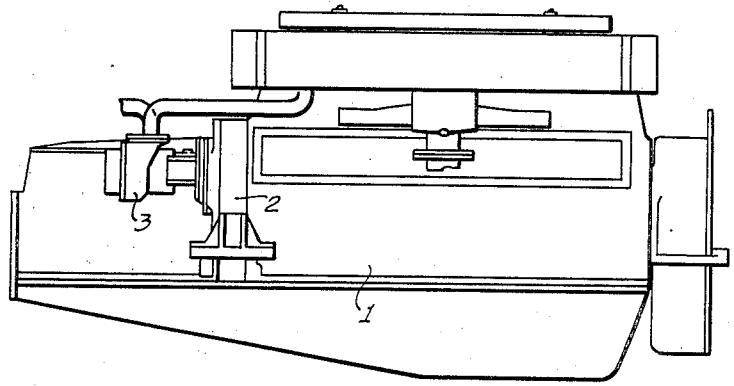
Figure 1 is an elevation illustrating the pump assembled on a marine engine.
Figure 2:
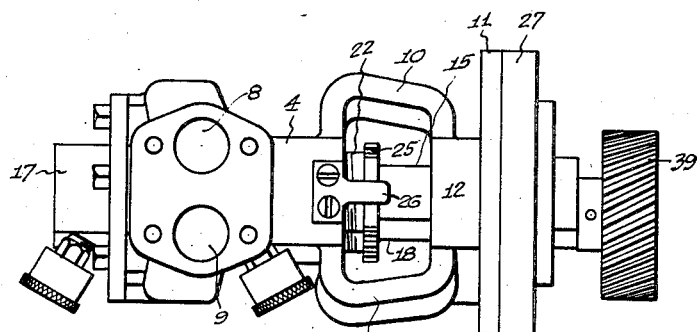
Fig. 2 is a plan view of the pump removed from the engine.
Figure 3:
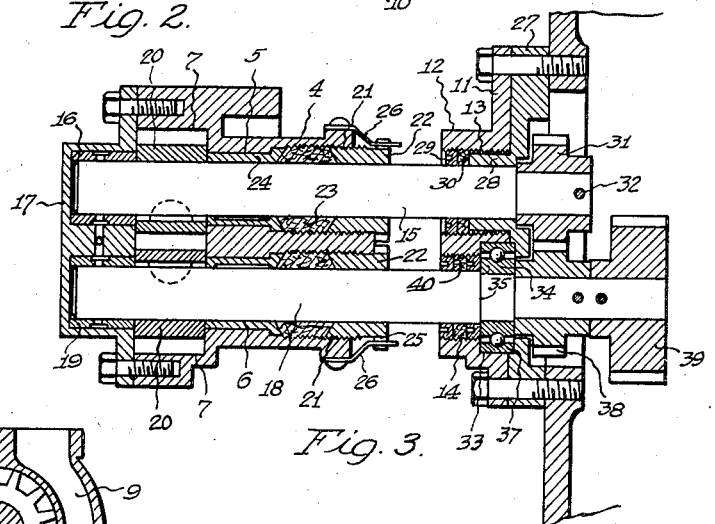
Fig. 3 is a vertical longitudinal section of pump.
Figure 4:
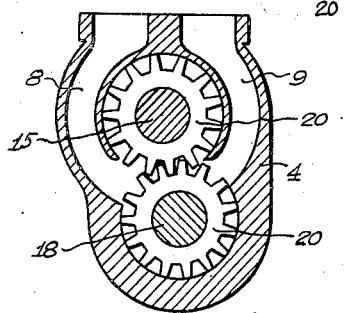
Fig. 4 is a transverse section.

Referring to the drawings, wherein like characters of reference are employed to designate corresponding parts, the numeral 1 designates a marine engine having a housing 2 containing gears (not shown) which are rotated upon operation of the engine in a manner already well known in the art and therefore not illustrated here. The present pump, generally designated 3, is mounted on the wall of the housing 2 so as to be driven by the gears contained therein.

In detail, the pump 3 comprises a body 4 with two parallel bores 5 and 6 opening into a recess 7 in one end of the body, the recess 7 being the pump chamber and having passages 8 and 9 opening thereinto on opposite sides thereof, the passages 8 and 9 being for the purpose of conveying liquid to and from the pump chamber. Integrally connected to the body 4 by yokes 10 is a plate 11 having a boss 12 formed with bores 13 and 14 which are co-axial with the bores 5 and 6 respectively. A shaft 15 extends through the bores 5 and 13 and through the pump chamber 7 and has one of its ends journaled in a bearing 16 in an end plate 17 which is bolted to the end of the body 4. A shaft 18 extends through the bores 6 and 14 and the pump chamber 7 and has one of its ends journaled in a bearing 19 in the end plate 17. Gears 20 are keyed on the shafts 15 and 18 within the chamber 7. Although the gears 20 are illustrated as meshing it will be understood that a slight clearance is provided therebetween, amounting to a few thousandths of an inch.

The bores 5 and 6 are provided with internally threaded zones 21 receiving externally threaded packing elements 22 to compress the packing material 23 against the conically recessed ends of bearings 24. The outer ends of the elements 22 have notched flanges 25 adapted to be engaged by spring fingers 26 to prevent rotation thereof.

The device above described is assembled on a base plate 27 having a tubular projection 28 extending into the bore 13. The bore 13 is internally threaded and receives a packing element 29 which compresses packing material 30 against the end of the tubular projection 28. The inner surface of the projection 28 provides a journal for the shaft 15 which extends therethrough and which has a gear 31 secured thereon by a pin 32 and key so that it is secured against lengthwise movement as well as rotation relative to the shaft 15.

The bore 14 is enlarged at 33 to receive a thrust bearing 34 which engages a shoulder 35 on the shaft 18, the bearing being locked in place by engagement of the base plate 27 therewith as designated at 37. Pinned and keyed on the shaft 18 is a gear 38 which meshes with the gear 31. Also pinned and keyed on the shaft 18 is a helical gear 39 which is the driving gear of the pump and which is adapted to be driven by engagement with a gear in the housing 2.

From the foregoing it becomes apparent that the only possible points through which the water might leak from the pump chamber 7 are the bores 5 and 6. In the event of such leakage it may be quickly stopped by tightening the elements 22. However, the water so leaking cannot contact the bearing 34 nor the journal 28 and inasmuch as the seals 39 and 40 protect these parts from the elements, etc., there is little wear at these points. The bearing 34 prevents the thrust of the helical gear 39 from causing wear of the pump gears 20 and by eliminating such wear the shaft 18 remains in proper alignment and the gear 39 does not cause excessive wear of the gears in the engine.

Figure 5:
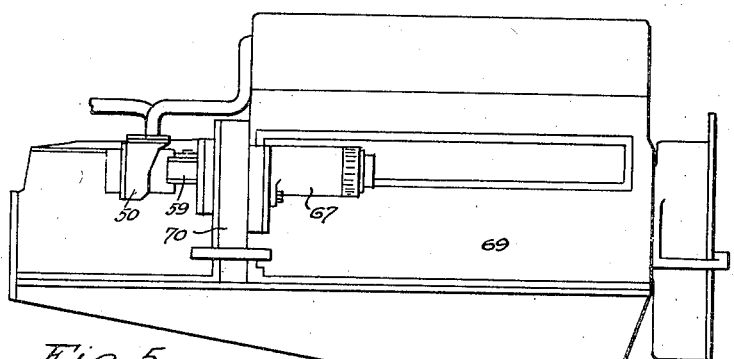
Fig. 5 is an elevation of an engine and modified pump.
Figure 6:
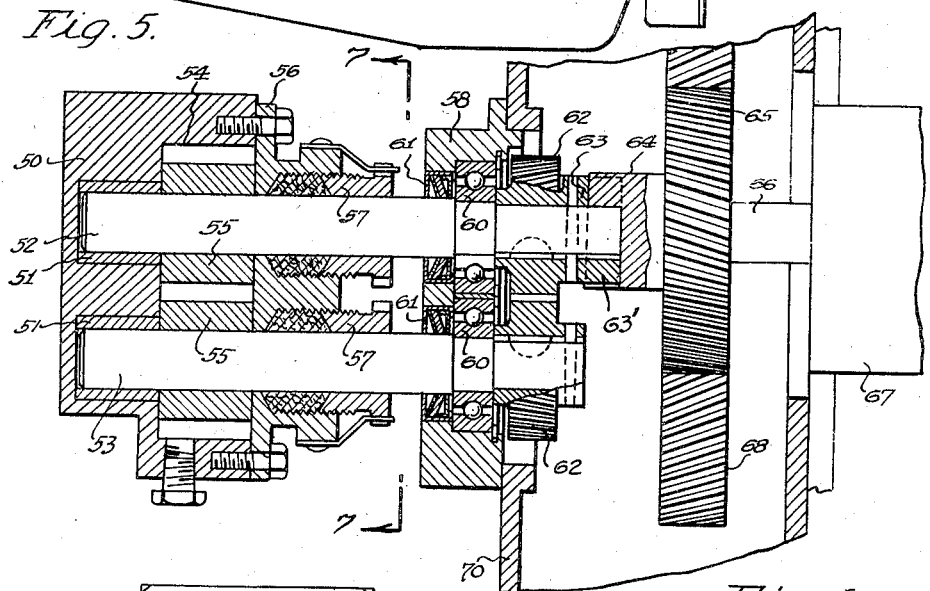
Fig. 6 is a vertical longitudinal section of the modified pump.
Figure 7:
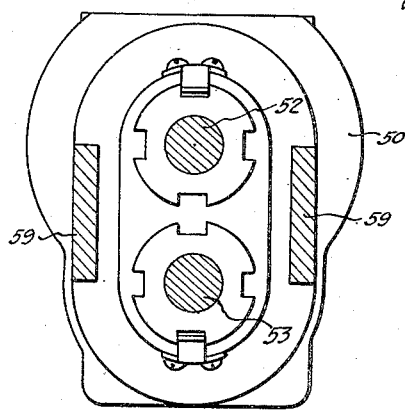
Fig. 7 is a section taken on the line 7—7 of Fig. 6.

In the form illustrated in Figs. 5 to 6 the body 50 has two bearings 51 supporting ends of the shafts 52 and 53, the body 50 also having a recess forming a chamber 54 for the reception of the gear impellers 55 on the shafts 52 and 53. The body 50 is bolted to a plate 56 supporting packing means 57 and connected to a base plate 58 by yokes 59. Thrust bearings 60 are received in the base plate to support the shafts and are sealed by the oil seal rings or packing glands 61. The shafts 52 and 53 are geared together by helical gears 62 which are pinned and keyed, as at 63, to their respective shafts. The gear on the shaft 52 has a square tooth clutch part 63' meshing with a similar clutch part 64 on a gear 65 on a shaft 66 which in this case is a shaft for driving an electric generator 67. The gear 65 meshes with a gear 68 which will be understood to be any gear driven by the engine 69 in the housing 70.

It will thus be seen that the present pump is automatically connected with the driving gear of the generator 67 when the pump is attached to the housing 70, and the end thrust of the generator or other driving element is taken care of by the thrust bearings so as to prevent wear of the gear pump. In addition, it will be seen that the radial and end thrust bearings 60 take care of the side wall wear of the gear pump and as the bearings are supported remote from the pump chamber there is no possibility of damage by water leaking from the pump.

Although specific embodiments of the invention have been illustrated and described it will be understood that various changes may be made within the scope of the appended claim without departing from the spirit of the invention; and such changes are contemplated.

What I claim is:—

A pump comprising a body having a recess with liquid ports in one end and a pair of parallel bores opening thereinto, a back plate having bores therein, integral yokes supporting said body and plate substantially spaced apart and with respective bores therein co-axial, shafts extending through respective bores and said recess, gear pump members on said shafts within said recess, a cover plate for the recessed end of said body, said cover plate having bearings therein rotatably supporting adjacent ends of said shaft, bearings and packing elements in the bores in said body, end thrust bearings on at least one of said shafts and engaging shoulders on said shaft and said base plate, a supplemental base plate secured to the first base plate and engaging said end thrust bearings to lock the assembly together, and meshing gears on said shafts disposed externally of the supplemental base plate.

DAVID SHERWOOD.